Oct. 28, 1958     D. G. DENING     2,858,409
CIRCUIT BREAKER FOR CIGAR LIGHTER
Filed Dec. 17, 1956
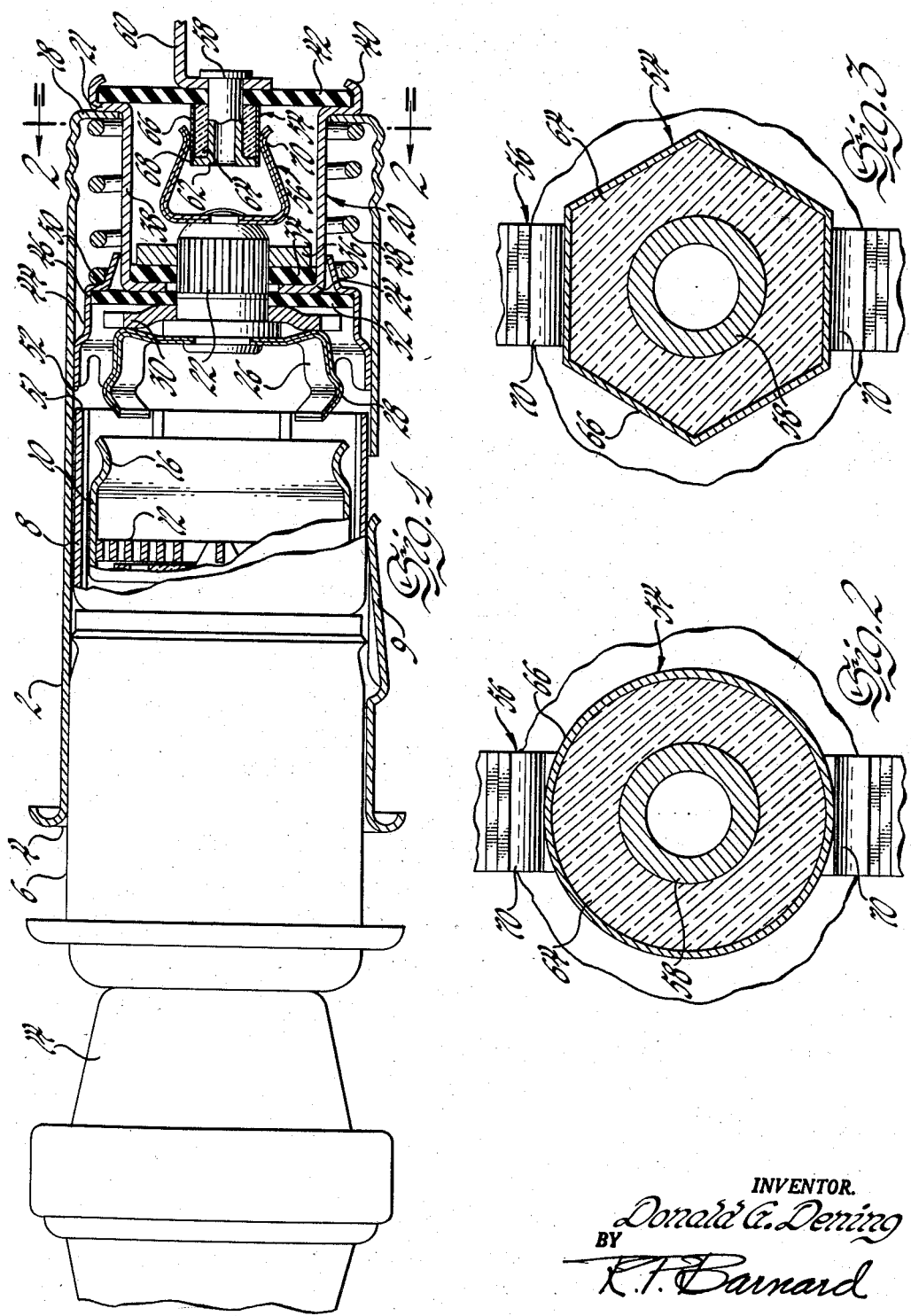
INVENTOR.
Donald G. Dening
BY
R. T. Barnard
ATTORNEY.

United States Patent Office 2,858,409
Patented Oct. 28, 1958

2,858,409

CIRCUIT BREAKER FOR CIGAR LIGHTER

Donald G. Dening, Rochester, N. Y., assignor to General Motors Corporation, Detroit, Mich., a corporation of Delaware Application December 17, 1956, Serial No. 628,598

16 Claims. (Cl. 219—32)

The present invention relates to a cigar lighter assembly of the type comprising a mounting case or sleeve adapted to be suitably secured to a vehicle instrument panel or the like, a manually removable igniting unit or plug carrying a heating element adapted to be received within the case to establish an electrical igniting or heating circuit from a suitable power source, such as a vehicle battery and, in particular, to a circuit breaker electrically connected between the power source and the igniting unit to break the igniting circuit upon malfunctioning of the latter.

In lighters of the type used on automobiles, the igniting unit while not in use is generally removably supported in a cylindrical sleeve or case mounted on the vehicle instrument panel. When it is desired to effect closure of the heating or igniting circuit, the igniting unit is pushed further into the supporting sleeve where it is held by bimetallic thermostatically responsive fingers which are part of the igniting or heating circuit and also function as a locking latch to maintain the igniting circuit to the heating element until the latter is raised to the desired temperature when it is automatically released to permit easy removal for use. In such a structure, a source of current such as the automobile battery is electrically connected to a contact carried by an end of the lighter mounting case or sleeve, suitable electrical and mechanical connections being provided internally of the case to conduct current from the battery to the bimetallic latch and contact member fixedly secured within the case. Similarly, the igniting unit or plug carries a cooperating current conducting latch member which, upon pushing the igniting plug further into the mounting case, latchingly engages the bimetallic member carried by the case to establish an igniting or heating circuit through the engaged latch means to the coiled heating element mounted within the plug and then to ground.

It has been found desirable to include in such lighter assemblies a means for preventing sustained malfunctioning thereof which otherwise would result in permanent damage to the assembly. By way of example, such an assembly may malfunction due to severe overload in the igniting circuit, normal loading in the circuit but for a greater than normal length of time, or due to leakage or partial leakage in the igniting circuit for a greater than normal time. Any one of these conditions will result in excessive heat thereby increasing the danger of fire and permanent damage to the various components of the assembly. It is, therefore, desirable to provide a cigar lighter assembly of the type described with a circuit breaker which is electrically and mechanically connected between the power source and the current conducting latch means carried, respectively, by the igniting unit and mounting case therefor. Such a circuit breaker as contemplated by this invention includes an element which is operable in response to the excessive heat generated as a result of the aforementioned conditions of assembly or circuit malfunctioning. Thus, such a circuit breaker will operate in response to malfunctioning in the assembly or circuit thereof to break the igniting or heating circuit, and to provide a means which will positively prevent the flow of current through the assembly. Without such a circuit breaker, the bimetallic latch means mounted within the mounting case may deflect from its normal engaged igniting position with respect to the latch member carried by the plug or igniting unit to release the latter; however, upon cooling of this bimetallic element, it will resume its original position for repeated engagements with the contact or latch member carried by the igniting unit. As will be apparent, a condition may be present in the lighter assembly or circuit which causes repeated occurrences of malfunctioning as aforedescribed thereby damaging the lighter assembly upon continued use thereof.

Within the scope of this invention, a cigar lighter assembly of the type disclosed is provided with an electrical heating or igniting circuit employing a manually resettable circuit breaker which precludes damage to the various parts of the assembly and is easily reset from the exterior thereof. Furthermore, the circuit breaker of this invention is so designed as to accommodate a predetermined number of instances of circuit malfunctioning without requiring manual resetting but which, upon repeated occurrences of malfunctioning, acts to permanently break the circuit until manually reset. To accomplish this result, the circuit breaker of this invention includes means responsive to the excessive heat generated by the particular condition of malfunctioning to positively break the igniting circuit.

It is, therefore, an object of this invention to provide a cigar lighter assembly comprising a mounting case having an open end for receipt of a removable igniting unit, engageable current conducting latch means carried respectively by the igniting unit and mounting case to establish an electrical igniting or heating circuit from a suitable power source to a heating element carried by the igniting unit, and a circuit breaker electrically connected between the power source and the engageable current conducting latch means which is automatically resettable for a predetermined number of times of circuit malfunctioning but which requires manual resetting thereafter.

It is a further object of this invention to provide a circuit breaker for the heating or igniting circuit of a cigar lighter assembly which, upon arcing of the current attendant to operation of the circuit breaker, will deteriorate a portion of the breaker to require manual resetting thereof prior to restablishment of the circuit.

It is another object of this invention to provide a circuit breaker in an igniting circuit for a cigar lighter assembly which includes a bimetallic thermostatically responsive contact member electrically connected within the circuit to supply current to the igniting unit, and which element normally engages another contact member having a metallized surface electrically connected to a power source and surrounding a plug or body of insulating material whereby, upon malfunctioning of the circuit and disengagement of the contact members, the arcing resulting will consume the metallized surface thereby exposing the insulating body to the thermostatically responsive element upon cooling of the latter and engagement with the other contact member.

It is a further object of this invention to provide a cigar lighter assembly of the type described with a manually resettable circuit breaker having a first contact member electrically connected to a power source and a second contact member electrically connected to engageable current conducting latch means positioned within the case for cooperation with a similar latch carried by the igniting unit, which second contact member includes a bimetallic thermostatically responsive element having diametrically opposed legs normally in engagement with the first contact member, whereby upon circuit malfunctioning and disengagement of the circuit breaker contact members, a metallized surface on the first contact member is deteriorated to expose a body of insulating materially underlying it.

It is a more specific object of this invention to provide a circuit breaker for a cigar lighter igniting or heating circuit which comprises first and second contact members axially fixedly disposed within one end of a cigar lighter case, the first contact member comprising a current conducting post mounted coaxially with the mounting case and terminating at one end in a radially extending flange, a body of insulating material surrounding the post and abutting the flange at one end thereof and a metallized surface formed around the insulating body and in electrical contact through the radially extending flange of the post with a source of electrical power, the second contact member comprising a bimetallic thermostatically response element normally engaging the metallized surface to establish an igniting circuit but which, upon circuit malfunctioning, disengages from the metallized surface resulting in arcing which, after a predetermined number of occurrences, will completely consume the metallized surface beneath the bimetallic element thereby exposing the insulating body for engagement with the second contact member upon its return to a normal position after cooling.

It is a further object of this invention to provide a circuit breaker for a cigar lighter assembly of the type described in which a first contact member thereof having a metallized surface electrically connected to a power source and surrounding an insulating body is normally engaged to maintain an electrical igniting circuit by a second thermostatically responsive contact member, which first contact member, upon deterioration of a localized area of the metallized surface portion to expose the insulating body due to arcing attendant to breaking of the circuit, may be manually adjusted to present a new metallized surface for engagement with the second bimetallic contact member.

These and other objects of this invention will appear more fully hereinafter as the description of the invention proceeds, reference being made to the accompanying drawings in which:

Figure 1 is an elevation of the cigar lighter assembly partly broken away to show the circuit breaker;

Figure 2 is a cross-sectional view on line 2—2 of Figure 1 showing one preferred form of the circuit breaker;

Figure 3 is a view corresponding to Figure 2 showing another embodiment of the circuit breaker.

Referring now to the drawings, there is shown a cigar lighter assembly comprising a mounting case sleeve or holder 2 having an open end 4 to removably receive an igniting unit or plug 6. The mounting case may be suitably secured by any well-known manner to a support such as a vehicle instrument panel so that the open end 4 lies substantially flush therewith while the remainder of the case lies behind such a panel. Insofar as is necessary for disclosure of this assembly, it may be noted that the igniting unit 6 comprises an outer cylindrical sleeve portion 8 surrounding a second recessed cylindrical cup 10 within which there is positioned a heating element 12, the cylindrical sleeve and cup and heating element being suitably secured in any well-known manner to a knob 14 provided on the igniting unit to be handled by the user of the lighter in placing the lighter in and removing it from the case 2. The heating element 12 is mechanically connected to the cup 10 to receive current therefrom in a well-known manner.

The cylindrical sleeve-like body portion 8 of the igniting unit is of such diameter with respect to the diameter of the mounting case 2 as to be frictionally held by a plurality of spring fingers 9 on the case when not in use to prevent the igniting unit from falling from the case. The inner cup-shaped member 10 surrounding the heating element 12 of the igniting unit has at its forward end a radially inwardly directed annular indentation 16 which prevents loose ashes from falling onto the clothing of the user or upon the upholstery of the vehicle when the igniting unit is being manipulated by the user. Furthermore, this indentation 16 acts as a movable latch means in cooperation with further fixed latch means mounted within the mounting case as will appear more fully hereinafter.

The rearwardly extending end of the mounting case has a radially inwardly directed flange 18 defining an aperture which receives a substantially cup-shaped member 20 having a flanged end 21 suitably secured to the flange 18. A current conducting stud 22 extends through an aperture in the bottom wall 24 of the cup 20 in spaced relation thereto and has secured at the forward end thereof a bimetallic, current conducting fixed latch means 26 having a radially outwardly projecting surface 28 adapted for selective cooperation, under control of the lighter user, with the radially inwardly projecting indentation 16 of the igniting unit to establish an igniting or heating circuit as will appear more fully hereinafter. Mounted about the stud 22 behind the bimetallic current conducting latch member 26 there is a metal plate 30 behind which there is positioned an annular insulating washer 32 which abuts the bottom wall 24 of the cup 20 for a purpose to be described hereinafter.

Within the cup-shaped member surrounding the stud 22 and abutting the bottom wall thereof, there is an annular insulating washer 34 against which there is secured on the stud a metal washer 36 the outer periphery of which is spaced from the side wall 38 of the cup 20. The rearwardly extending annular flange portion 21 of the cup 20 has a plurality of inwardly projecting locking tabs 40 which secure an insulating washer 42 over the rearwardly extending end of the cup 20 and mounting case 2 to close that end of the assembly.

A substantially cup-shaped member 44, open at both ends, is slidably disposed about the cup 20 within the mounting case 2 and, when the igniting circuit is not established, is normally held in its extreme forward position in abutment with the outer periphery 46 of the insulating washer 32 by an ejection spring 48 which abuts the annular shoulder 50 of the member 44 and is seated against the radially inwardly directed flange 18 at the rear of the mounting case 2.

The assembly so far described is of substantially the same design and functions in substantially the same manner as that disclosed in copending application of Clarence H. Jorgensen and Donald G. Dening, Serial Number 375,318, filed August 20, 1953. Lighters of this type will function as follows: In its normal position of non-use, the outer cylindrical sleeve portion 8 of the igniting unit is frictionally received within the mounting case 2 in a non-circuit establishing relationship. If the user desires to ignite the unit 6, he merely pushes the knob 14 to project the igniting unit further into the mounting case at which time the radially outwardly projecting surface 28 of the bimetallic latch member 26 mounted within the case latchingly engages the radially inwardly extending indentation 16 of the cup 10 surrounding the heating element of the igniting unit to establish an igniting or heating circuit from a suitable electrical power source, such as an automobile battery, through the stud 22, latch members 26, 16, and cup 10 to the heating element 12 and then to ground. Depressing the igniting unit further into the case causes the rearwardly extending annular edge 51 of the igniting unit sleeve 8 to engage the forwardly extending edge 52 of the spring biased cup-shaped member 44 to depress the latter further into the mounting case. Upon the heating element 12 of the igniting unit reaching a sufficient temperature, the thermostatically responsive latch member 26 will deflect inwardly toward the longitudinal axis of the case, thereby disengaging the latch permitting the ejector spring and cup to project the igniting unit outwardly to its normal position which signifies to the user that he may remove the igniting unit for use.

For one reason or another, the igniting circuit may be overloaded, energized for too great a period of time or short circuited, thereby resulting in damage to the assembly. To preclude this possibility, a circuit breaker comprising first and second contact members respectively designated at 54 and 56 is mounted within the cup-shaped member 20 positioned in the rearward end of the mounting case 2. The first contact member 54 includes an axially extending current conducting post 58 which suitably secures to the outer face of the insulating washer 42 a contact member 60 electrically connected to a vehicle battery or other suitable power source. At its other forwardly extending end, the post 58 is flared radially outwardly to form an annular flange 62. Surrounding the post between the flange 62 thereof and the inner side of the insulating washer 42 there is provided a body of suitable insulating material 64. This body of insulating material is coated with a metallized surface 66 which is in contact with at least the outer peripheral edge 68 of the flange 62 of the current conducting post 58. The second contact member 56 is fixedly secured to the stud 22 as by riveting and comprises two diametrically opposed bimetallic thermostatically responsive legs 70 the rearward extremities of which normally resiliently engage the metallized surface 66 of the first circuit breaker contact member 54.

In operation, if the igniting circuit from the power source to the heating element 12 becomes overloaded, or malfunctions as aforementioned, the thermostatically responsive legs 70 of the second circuit breaker contact member will deflect outwardly from the metallized surface 66 in response to the excessive heat generated by such malfunctioning to break the circuit. In so doing, arcing occurs which variably consumes some or all of the metallized surface at the point of contact of the latter with the legs 70. Although the number of times of operation of the circuit breaker required to completely consume any localized area of the metallized surface depends upon design factors such as the thickness of the metallized surface and the type of thermostatically responsive element employed, it is preferred to design the circuit breaker so as to provide for complete consumption of any localized area of the metallized surface contacted by the thermostatically responsive legs after two or three openings. It will be readily apparent that, after the desired number of openings of the circuit breaker and upon cooling of the thermostatically responsive legs 70, the latter will return to their normal positions at which time they will engage a localized surface of the insulating body 64 now exposed because the metallized surface therefor has been burned away. Accordingly, after the pre-selected number of openings, the igniting circuit cannot be automatically reestablished although the circuit elements have returned to their normal positions.

To enable the circuit breaker to be manually reset, the post 58 and metallized insulating body 64 may be mounted for selective manual rotation to any one of a plurality of angular positions. To accomplish this purpose, the insulating washer 42 may be fixed relative to the post 58 and metallized insulating body 64 while being adjustably rotatably secured within the tabs 40 of the cup 20. Alternatively, the insulating washer 42 may be fixed relative to the cup 20 while the post 58 and metallized insulating body 64 may be mounted therein as by friction for selective rotation to any one of a plurality of angular postions relative to the thermostatically responsive legs 70 of the second contact member of the circuit breaker.

The first contact member 54 of the circuit breaker may be of any suitable cross section to accomplish manual resetting such as circular as shown in Figure 2, hexagonal as shown in Figure 3, or any other desired polygonal cross-sectional shape. If a polygonal cross section is employed, the sides or lobes thereof provide a convenient means for signifying to the adjuster thereof that new metallized lobes are in contact with the thermostatically responsive leg portions 70 of the circuit breaker which resiliently engage them.

It may now be appreciated that a cigar lighter assembly has been disclosed comprising a case having an open end for the receipt of a removable igniting unit, engageable latch means carried respectively by the igniting unit and case to establish an electrical igniting circuit from a power source to the igniting unit, and a circuit breaker electrically connected between the power source and engageable latch means to positively interrupt the flow of current upon generation of excessive heat in the assembly due to malfunctioning therein. Further, it may be seen that after repeated instances of malfunctioning, the circuit breaker will not operate to reestablish the circuit until manually reset, which resetting is easily accomplished without dismantling the assembly.

I claim:

1. A cigar lighter assembly comprising, a case having an open end for receipt of a removable igniting unit, engageable means carried respectively by said igniting unit and case to establish an electrical igniting circuit from a power source to said igniting unit, a circuit breaker electrically connected between said power source and engageable means; said circuit breaker comprising a first contact member including a body of insulating material, a metallized surface surrounding said body and connected in said circuit, and a thermostatically responsive second contact member normally in contact with said metallized surface.

2. A cigar lighter assembly comprising a case having an open end for receipt of a removable igniting unit, current conducting members mounted respectively on said removable igniting unit and within said case to establish an electrical circuit to conduct an igniting current from a power source to said igniting unit upon electrical contact of said members, a circuit breaker connected in circuit between one of said members and said power source; said circuit breaker comprising a first contact member having a metallized surface surrounding a body of insulating material, and a thermostatically responsive second contact member normally in contact with said metallized surface whereby, upon generation of excessive heat by said circuit and disengagement of said contact members, the arcing current consumes said metallized surface exposing said insulating body.

3. The cigar lighter assembly as defined in claim 2 in which the thermostatically responsive element includes a bimetallic prong having diametrically opposed legs normally engaged with said metallized surface.

4. The cigar lighter assembly as defined in claim 2 in which said insulating body is circular in cross section.

5. The cigar lighter assembly as defined in claim 2 in which said insulating body is polygonal in cross section.

6. A cigar lighter assembly comprising a case having an open end for receipt of a removable igniting unit, engageable means carried respectively by said igniting unit and case to establish an electrical igniting circuit form a power source to said igniting unit, a circuit breaker connected between said power source and engageable means; said circuit breaker comprising a conducting post having a radially outwardly projecting flange at one end, a body of insulating material surrounding said post, a metallized surface surrounding said body and in contact with said flange, and a thermostatically responsive second contact member normally in contact with said metallized surface.

7. A cigar lighter assembly comprising a case having an open end for receipt of a removable igniting unit, engageable means carried respectively by said igniting unit and case to establish an electrical igniting circuit from a power source to said igniting unit, a circuit breaker connected between said power source and engageable means; said circuit breaker comprising first and second contact members mounted within said case opposite said open end, said first contact member including a current conducting post, a body of insulating material surrounding said post, and a metallized surface surrounding said body and in contact with said post, said second contact member including a thermostatically responsive element normally in contact with said metallized surface.

8. A cigar lighter assembly comprising a case having an open end for receipt of a removable igniting unit, engageable means carried respectively by said igniting unit and case to establish an electrical igniting circuit from a power source to said igniting unit, a circuit breaker connected between said power source and engageable means; said circuit breaker comprising a first contact member mounted in said case opposite the open end thereof, a second contact member mounted within said case between said first contact member and said engageable means, said second contact member including a thermostatically responsive element, said first contact member including a metallized surface normally engaged by said thermostatic element and surrounding a body of insulating material whereby, upon generation of excessive heat by said circuit and disengagement of said thermostatic element from said metallized surface, the arcing current consumes said metallized surface to expose said insulating body.

9. A cigar lighter assembly comprising a case having an open end for receipt of a removable igniting unit, engageable means carried respectively by said igniting unit and case to establish an electrical igniting circuit from a power source to said igniting unit, a circuit breaker connected between said power source and engageable means; said circuit breaker comprising first and second contact members within said case opposite the open end thereof, said first contact member comprising a current conducting post in circuit with said power source, a body of insulating material surrounding said post, a metallized surface surrounding said body and in contact with said post, said second contact member comprising a thermostatically responsive element electrically connected to said engageable means and normally in contact with said metallized surface.

10. A cigar lighter assembly comprising a case having an open end for receipt of a removable igniting unit and a closed end opposite thereto, engageable means carried respectively by said igniting unit and case to establish an electrical igniting circuit from a power source to said igniting unit, a circuit breaker connected between said power source and engageable means; said circuit breaker comprising a first contact member selectively rotatively secured in one of a plurality of positions in the closed end of said case, said first contact member comprising a body of insulating material, a metallized surface surrounding said body and electrically connected in said igniting circuit, a second contact member mounted within said case between said first contact member and said engageable means, said second contact member including a thermostatically responsive element normally in contact with said metallized surface.

11. A cigar lighter assembly comprising a case having an open end for receipt of a removable igniting unit and a closed end opposite thereto, engageable means carried respectively by said igniting unit and case to establish an electrical igniting circuit from a power source to said igniting unit, a circuit breaker connected between said power source and engageable means; said circuit breaker comprising a first contact member selectively rotatively secured in one of a plurality of positions in the closed end of said case, said first contact member comprising a current conducting post electrically connected to said power source, a body of insulating material surrounding said post, a metallized surface surrounding said body and in contact with one end of said post, a second contact member mounted within said case between said first contact member and said engageable means, said second contact member including a thermostatically responsive element normally in contact with said metallized surface.

12. A cigar lighter assembly comprising a case having an open end for receipt of a removable igniting unit and a closed end opposite thereto, engageable means carried respectively by said igniting unit and case to establish an electrical igniting circuit from a power source to said igniting unit, a circuit breaker connected between said power source and engageable means; said circuit breaker comprising a first contact member selectively rotatively secured in one of a plurality of positions in the closed end of said case, said first contact member comprising a current conducting post electrically connected to said power source and having a radially extending flange at one end thereof, a body of insulating material surrounding said post adjacent said flange, a metallized surface surrounding said body and in contact with said flange, a second contact member mounted within said case between said first contact member and said engageable means, said second contact member including a thermostatically responsive element normally in contact with said metallized surface.

13. A cigar lighter assembly comprising a cylindrical case open at one end, an igniting unit manually removably mounted within said case through said open end, engageable latching means carried respectively by said igniting unit and case to establish an electrical igniting circuit from a power source to said igniting unit, a circuit breaker connected between said power source and latching means within said case; said circuit breaker comprising axially fixedly mounted first and second contact members, said first contact member being selectively rotatively secured in one of a plurality of positions in the end of said case opposite said open end, said first contact member comprising a metallized surface electrically connected to said power source and surrounding a body of insulating material, said second contact member being electrically connected to said latching means and including a thermostatically responsive element normally in contact with said metallized surface.

14. A cigar lighter assembly comprising a case having an open end for receipt of a removable igniting unit, engageable means carried respectively by said igniting unit and case to establish an electrical igniting circuit from a power source to said igniting unit, a circuit breaker connected between said power source and said engageable means; said circuit breaker comprising first and second contact members mounted within said case opposite said open end, said first contact member including a current-conducting post, a body of insulating material surrounding said post and being polygonal in cross section, and a metallized surface on said body and in electrical contact with said post, said second contact member including a thermostatically responsive element normally in contact with said metallized surface.

15. A cigar lighter assembly comprising a case having an open end for receipt of a removable igniting unit and a closed end opposite thereto, engageable means carried respectively by said igniting unit and case to establish an electrical igniting circuit from a power source to said igniting unit, a circuit breaker connected between said power source and engageable means; said circuit breaker comprising a first contact member selectively rotatably secured in one of a plurality of positions in the closed end of said case, said first contact member comprising a current-conducting post electrically connected to said power source, a body of insulating material surrounding said post and being polygonal in cross section, a metallized surface on said body and in electrical contact with said post, a second contact member mounted within said case between said first contact member and said engageable means, said second contact member including a thermostatically responsive element normally in contact with said metallized surface.

16. A cigar lighter assembly comprising a case having an open end for receipt of a removable igniting unit, engageable means carried respectively by said igniting unit and case to establish an electrical igniting circuit from a power source to said igniting unit, a circuit breaker connected between said power source and engageable means; said circuit breaker comprising a current conducting post having a radially outwardly projecting flange at one end thereof, a body of insulating material surrounding said post and being polygonal in cross section, a metallized surface on said body in contact with said flange and a thermostatically responsive second contact member normally in contact with said metallized surface.

References Cited in the file of this patent

UNITED STATES PATENTS

| | | |
|---|---|---|
| 426,082 | Thomson | Apr. 22, 1890 |
| 2,180,711 | Lehmann | Nov. 21, 1939 |
| 2,704,318 | Jorgensen et al. | Mar. 15, 1955 |
| 2,778,915 | Jorgensen et al. | Jan. 22, 1957 |
| 2,780,695 | Sundt | Feb. 5, 1957 |

FOREIGN PATENTS

| | | |
|---|---|---|
| 270,969 | Great Britain | May 12, 1927 |